United States Patent [19]
Gnadt et al.

[11] Patent Number: 5,609,058
[45] Date of Patent: Mar. 11, 1997

[54] METHOD OF DETERMINING BACKLASH

[75] Inventors: James J. Gnadt, Fairport; David A. Wright, Victor, both of N.Y.

[73] Assignee: The Gleason Works, Rochester, N.Y.

[21] Appl. No.: 251,552

[22] Filed: May 31, 1994

[51] Int. Cl.$^6$ .................................................. G01M 13/02
[52] U.S. Cl. ............................................ 73/162; 33/501.8
[58] Field of Search ........................... 73/162; 33/501.7, 33/501.8, 501.13, 501.15; 364/560

[56] References Cited

U.S. PATENT DOCUMENTS

| | | | |
|---|---|---|---|
| 3,352,023 | 11/1967 | Budnick | 33/501.8 |
| 3,717,958 | 2/1973 | Ellwanger et al. | |
| 4,261,198 | 4/1981 | Moore | 73/162 |
| 4,519,242 | 5/1985 | Hofler et al. | 73/162 |
| 4,608,862 | 9/1986 | Klukowski et al. | 73/162 |
| 4,704,799 | 11/1987 | Kobetsky | 33/501.8 |
| 4,788,476 | 11/1988 | Ginier | |
| 4,902,175 | 2/1990 | Faulstich et al. | 409/12 |
| 4,931,949 | 6/1990 | Hernandez et al. | 73/162 |
| 5,113,704 | 5/1992 | Yano et al. | 73/162 |
| 5,231,875 | 8/1993 | Honda | 33/501.8 X |
| 5,307,676 | 5/1994 | Gutman | 73/162 |
| 5,373,735 | 12/1994 | Gutman | 73/162 |

OTHER PUBLICATIONS

Patent Abstracts of Japan, vol. 13, No. 436, (P–938), Sep. 29, 1989, "Method and Apparatus For Measuring Backlash of Gear" Japanese Patent Application No. 01–165929, Jun. 26, 1989, Hitachi Ltd.

Paikin, I. M., "Monitoring of Kinematic Quality Parameters of Precision Spur Gear Transmissions" *Measurement Techniques*, vol. 25, No. 2, New York, Feb. 1982, pp. 125–128.

Smith, Robert E., "Single Flank Data Analysis and Interpretation" *Gear Technology*, Sep.–Oct. 1985, No. 5, Elk Grove, Illinois, pp. 20–34.

*Primary Examiner*—Elizabeth L. Dougherty
*Attorney, Agent, or Firm*—Robert L. McDowell; Ralph E. Harper

[57] ABSTRACT

A method of determining backlash wherein one member of a gearset is rotated in a first direction and rotary positions are recorded at predetermined increments. The rotary positions of the other member of the gearset are recorded simultaneously with those of the one member. The direction of rotation of the one member is reversed and rotary positions are recorded at the same increments while simultaneously recording the rotary positions of the other member. The difference in recorded positions for the other member are calculated thus representing the amount of gearset backlash.

17 Claims, 2 Drawing Sheets

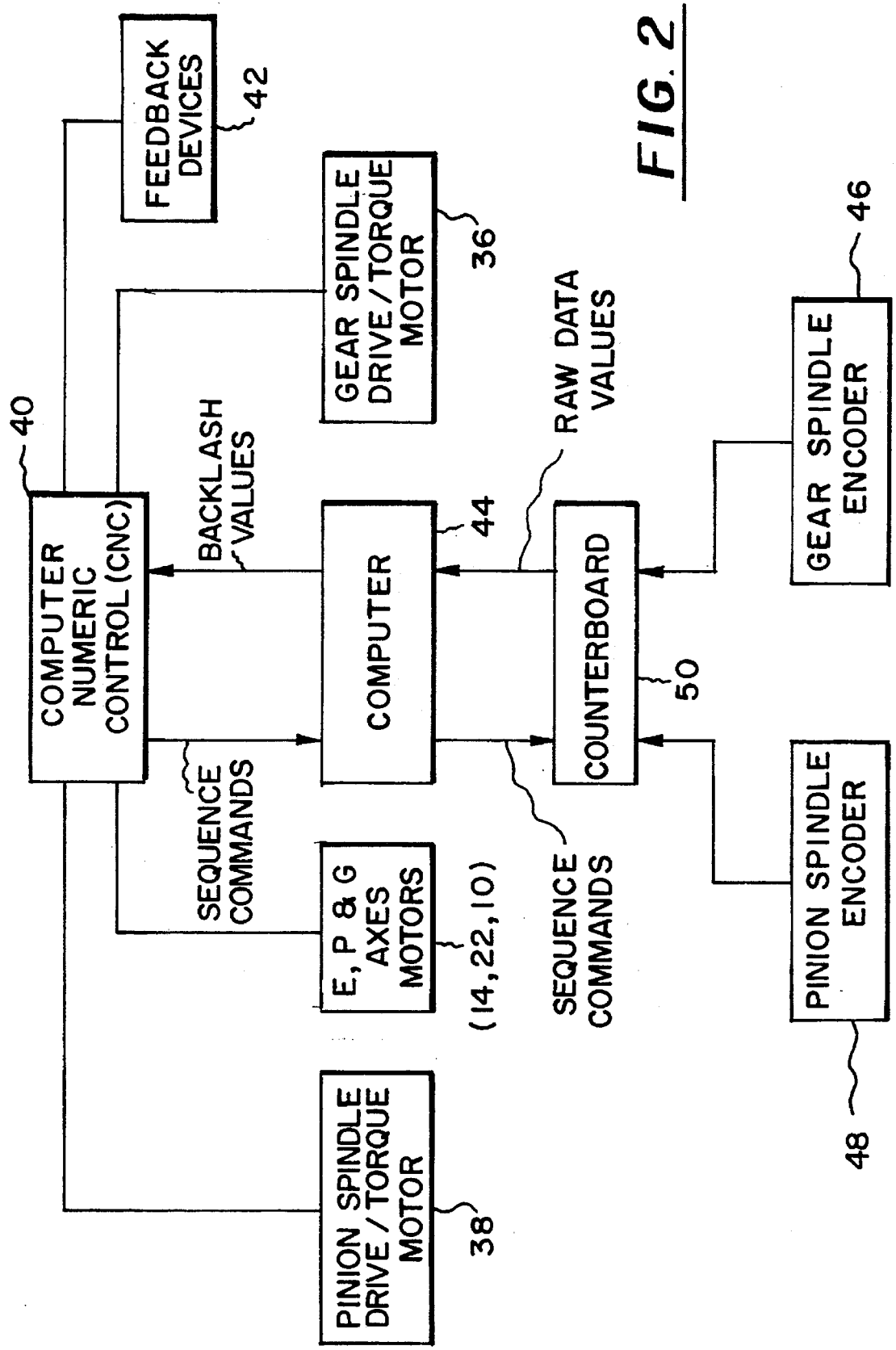

METHOD OF DETERMINING BACKLASH

FIELD OF THE INVENTION

The present invention is generally directed to gear technology and in particular is directed to a method of determining backlash in a gear set.

BACKGROUND OF THE INVENTION

Backlash is the term used to describe the amount of clearance between the teeth of two gears in mesh. Gear designs specify an optimum value for backlash and mass production experience identifies the variance gearsets may exhibit in each application to meet quality goals. Additionally, the positional relationship must also be controlled for economical assembly.

Backlash is an important parameter in lapping and testing procedures for gears. Lapping involves running the gear set in mesh with the application of an abrasive compound, while varying the relative position of the gears, to smoothen the tooth surfaces and modify the contact surfaces. Lapping gear sets includes the control of several machine functions simultaneously to achieve the desired effects of reduced gear noise and increased strength. A basic lapping process requirement is to control backlash near the design value to allow for smooth, unforced operation of the gear set.

Early lapping machines controlled backlash through the sequencing of machine motions. The gearset would first be meshed into direct contact condition with no backlash, called the "metal-to-metal" condition. When at this position, the machine motions would be clamped, then additional motions would mechanically actuate to separate the workpieces, producing the backlash. This process produced uncertain results because the machine elements also involved springs, motion guides with clearance, deflections, etc., which tended to be variable. Since the machine adjustment occurred at one point of mesh, the part variability which would occur at other mesh points was not considered. The availability of economical positional controls improved this situation because now the operator could compensate for certain machine errors through control inputs. Although these controls allowed for easier machine adjustments, the underlying mechanical conditions still existed.

With control of the machine motions using positional controls such as stepping motors, as disclosed in U.S. Pat. No. 3,717,958 to Ellwanger et al. for example, the opportunity now existed to provide corrective machine movements if the desired movement could be identified and quantified. Many attempts were made to apply transducers and other similar mechanical devices to sense backlash in the gearsets. The goal was to provide feedback to allow the machine motions to reset to a more ideal lapping relationship. Unfortunately, the feedback devices used were still too variable for the desired results. Measurements were still made at one mesh point, resulting in a large source of variability. Ultimately, this sort of approach was abandoned on this vintage of machine.

The advent of computer numerical controls (CNC) in lapping machines, such as disclosed in U.S. Pat. No. 4,788,476 to Ginier, provided a new level of opportunity to address the backlash situation. With direct control of machine motion position, the mechanical machine tool chassis required for lapping could be resolved into three or four machine movements. The resulting chassis was much stiffer and provided for much less variability in measurement. The conditions now existed to reapply transducers to the task of measuring backlash. The measurements, however, were still mechanical in nature and therefore subject to certain variabilities. Depending on the nature of the measurement taken, the value may also have to be correlated mathematically with defined gear backlash. Such a mathematical model in practical form is in itself a source of variability. The measurements could now be taken at several mesh positions to identify part-related variability.

It is an object of the present invention to provide a method of measuring backlash where all measurements are taken under controlled conditions whereby actual backlash values are measured, not approximated as in the prior art.

SUMMARY OF THE INVENTION

The present invention is directed to a method of determining backlash in a gear set wherein the set comprises a first member and a second member with the first member having a number of teeth equal to or greater than the second member. One well known type of gear set comprises a gear member and a pinion member with the gear member having a number of teeth equal to or greater than the pinion member which is the smaller member of the gear set. Usually, the pinion member is the drive member of the gear set and the gear member is the driven member of the gear set. The present invention will be described in terms of gear and pinion members. However, the present invention is not to be limited to a gear set comprising a gear and pinion but should be seen to encompass any meshing gear-type members.

The method comprises placing the first and second members in mesh and rotating the members whereby the first member is rotated in a first direction. The rotary positions of one of the first and second members is recorded at predetermined increments while the rotary position of the other of the first and second members is recorded simultaneously with the recording of the one member.

The first member is then rotated in the opposite direction and the rotary positions of the one member is recorded at each of the predetermined increments with the rotary positions for the opposite direction of rotation being the same as the rotary positions for the first direction of rotation. The rotary position of the other member is recorded simultaneously with the recording of the one member rotary position.

The difference between the rotation positions recorded for the other member is calculated at each like increment of the one member rotation in the first direction and the opposite direction. The difference values obtained represent backlash values for the gear set.

The present inventive method further includes determining a single representative backlash value from all the calculated difference values and comparing the representative value with a predetermined acceptable backlash value. If the representative value is within a desired range from the predetermined acceptable backlash value, the gear set is acceptable and then it may be further processed such as by lapping. However, if the representative value is outside of the desired range, the relative positional changes of the gear and pinion members necessary to achieve the acceptable backlash are determined. The gear and/or pinion members may then be moved from their prior evaluated positions to the newly determined relative positions, and, the gear set is further processed, such as by lapping.

BRIEF DESCRIPTION OF THE DRAWINGS

FIG. 2 illustrates the control system for the machine in FIG. 1.

DETAILED DESCRIPTION OF THE PREFERRED EMBODIMENT

Figure 1:
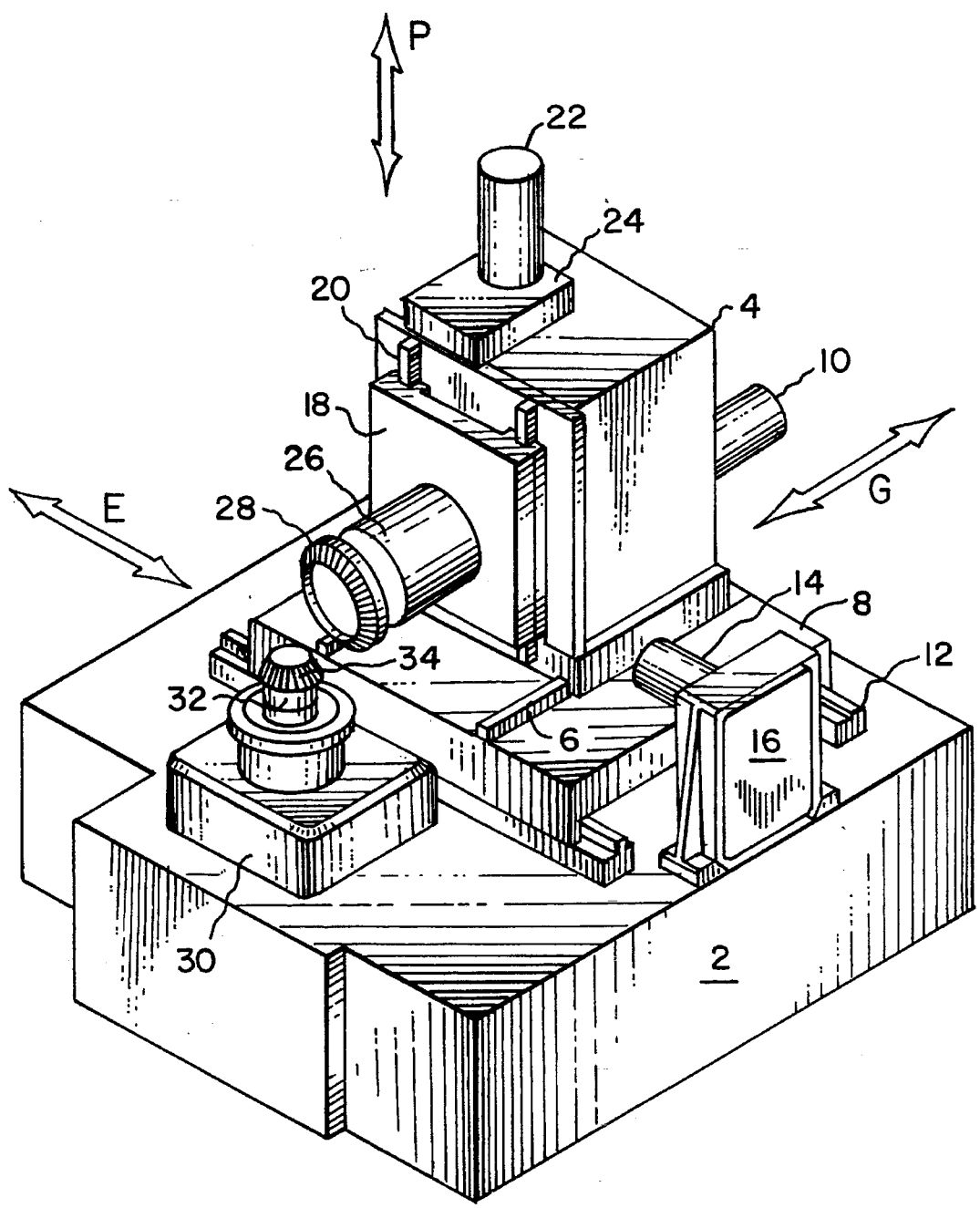
FIG. 1 schematically illustrates a machine for carrying out the inventive process.

The details of the present invention will now be discussed with reference to the accompanying Figures.

The present invention may be carried out on any machine capable of rotating a gear set in mesh, monitoring the rotational positions of the members of the gear set, and relatively positioning the gear set members with respect to one another. Preferably, the machine is a computer numerically controlled (CNC) lapping or testing machine capable of relative rotational and translational movement of the members of the gear set and including electronic measuring of the rotational positions of the workpiece spindles. Machines of this type are widely known and readily available.

One such machine is schematically shown in FIG. 1. The machine will be discussed as a lapping machine but it is to be understood that the same machine components could also apply to and perform the appropriate functions of a testing machine.

The lapping machine includes a base 2 upon which is mounted a gear head 4. The gear head 4 is linearly movable in a first direction (G-axis) on guides or ways 6 located on cross slide 8. Movement along the ways 6 is effected by motor 10. Cross slide 8, and hence gear head 4, is linearly movable (E-axis) on guides or ways 12 mounted to machine base 2. Movement of cross slide 8 is effected by motor 14 acting through suitable reduction gearing 16. The G and E axes are mutually perpendicular to one another.

Mounted for vertical movement (P-axis) to gear head 4 via guides or ways 20 is a vertical slide 18. Movement of vertical slide 18 is effected by motor 22 acting through reduction gearing 24. Movement in the P-axis direction is perpendicular to both the G and E axes thus making G, E, and P axes mutually perpendicular with respect to one another. Attached to vertical slide 18 is rotatable gear spindle 26 to which a gear 28 is removably mounted. Gear spindle 26 is rotated by a motor 36 (FIG. 2) located within gear head 4.

Also located on machine base 2 is pinion spindle housing 30 through which passes a rotatable pinion spindle 32 having a pinion member 34 removably mounted thereon. Pinion spindle 32 is rotated by a motor 38 (FIG. 2) located within machine base 2. The gear spindle motor 36 and pinion spindle motor 38 work in conjunction to produce process speeds and yet provide a torque differential.

Movement of the work head 4, cross slide 8, vertical slide 18, as well as the gear spindle 26 and pinion spindle 32 as noted above, is imparted by separate drive motors 10, 14, 22, 36, and 38, respectively. The above-named components are capable of independent movement with respect to one another or may move simultaneously with one another. Each of the respective motors is associated a feedback device 42 (FIG. 2), such as a linear or rotary encoder, or transducer, as part of a CNC system which governs the operation of the drive motors in accordance with instructions input to a computer controller 40 (FIG. 2).

In lapping or testing processes, relative movement along the E and P axes effect positional changes in the contact pattern of the members of the gearset, in effect modifying the contact pattern. Lapping involves rotating the gear members in mesh with contact at a desired position on the tooth surfaces. Thus, the members are located at particular E and P axes positions along with a particular G axis position to effect the desired backlash.

Typically, the E, P, and G axes movements each have an effect on both the lengthwise and depthwise position of the localized tooth contact pattern, the primary effect of the E-axis movement being on the relative lengthwise position of the contact pattern, the primary effect of P-axis movement being on the relative depthwise position of the contact pattern, and the primary effect of G-axis movement being on the backlash.

As the gear set is lapped, contact is shifted toward one of the outer (heel) or inner (toe) portions of the tooth surface by changing the E and P settings as necessary to effect such a shifting of the contact position. As E and P are changed to effect the shifting, the G axis position must also be changed to maintain the desired backlash. When the desired heel or toe position is reached, E and P axes positions are again changed to shift contact to the other of the heel or toe positions with the changing E and P positions being accompanied by an appropriate G-axis change to maintain backlash. The contact position is then returned to the beginning position.

The present invention eliminates the variabilities of backlash measurement which heretofore existed in lapping or testing of gearsets and instead presents a fast and accurate measurement of backlash.

The inventive method comprises mounting a gear member to a gear spindle and a pinion member to a pinion spindle on a lapping or testing machine. The gear and pinion are brought into mesh by relative movement along the E, P, and G axes, preferably into metal-to-metal contact. One of the members is then relatively withdrawn by an amount along the G-axis to provide backlash.

One of the gear and pinion is designated a master and the other member is designated a slave for the purpose of recording their angular positions as will be described. Preferably, the pinion is designated as the master and the process will be discussed in this manner it being clearly understood that the gear member may also serve as the master for the purposes of the present invention.

The present invention is preferably performed by computing and encoder devices separate from the computer numeric control 40 and axes feedback devices 42 as shown in FIG. 2. A computer 44, which preferably is at least a 33 MHz processor for example, receives sequence commands from the controller 40. The computer 44 is interfaced, via counterboard 50, with rotary position feedback devices, such as fifty-fold interpolation, quadrature-signal encoders 46, 48 associated with the gear and pinion spindles, at particular encoder-to-spindle ratios. Counterboard 50 receives sequence commands from the computer 44 and pairs the simultaneous readings of the two encoders 46, 48 at intervals dictated by the computer and sends the raw data to the computer 44. The computer 44 manipulates the readings, as will be discussed below, to determine backlash values and sends the values to the controller 40.

Of course, if capable, the appropriate feedback position devices 42 and computer controller (CNC) 40 may be utilized to read and process data to determine backlash according to the method of the present invention.

With the pinion as master, torque is applied to the gear spindle in a direction opposite to the direction in which the gear will rotate and in an amount to maintain contact between the gear and pinion. The gear set is then rotated causing the pinion to rotate in a first direction (e.g. clockwise) and the rotary position of the pinion is measured at predetermined increments by an encoder and recorded. The increment is zero. Therefore, only the rotary measurements for the slave member remain and these differences represent the actual backlash values at each increment of rotary measurement. The Table below provides an example of measured backlash values.

| | | | | | | |
|---|---|---|---|---|---|---|
| | | Gearset Ratio | 3:1 | | | |
| | Encoder-to-Spindle Ratio | | 3:1 | | | |
| | Encoder Increments/Rev. | | 720,000 (2,160,000 with ratio) | | | |
| | Data Collection Increment | | each 180,000 increments of pinion rotation (540,000 increments with ratio) | | | |

| Raw Data (CW) | Raw Data (CW) | Raw Data (CCW) | Raw Data (CCW) | Raw Backlash Data | Qualified Non-Zero Backlash Data | Sorted Qualified Non-Zero Backlash Data |
|---|---|---|---|---|---|---|
| Pinion | Gear | Pinion | Gear | | | |
| 540000 | 179500 | 540000 | 180450 | 950 | 950 | |
| 1080000 | 359850 | 1080000 | 360760 | 910 | 910 | 894 (min.) |
| 1620000 | 539552 | 1620000 | 539860 | 308* | | 910 |
| 2160000 | 719776 | 2160000 | 720703 | 927 | 927 | 916 |
| 2700000 | 899660 | 2700000 | 900652 | 992 | 992 | 922 |
| 3240000 | 1080058 | 3240000 | 1081020 | 962 | 962 | 927 |
| 3780000 | 1259712 | 3780000 | 1260628 | 916 | 916 | 937 (median) |
| 4320000 | 1439905 | 4320000 | 1440842 | 937 | 937 | 950 |
| 4860000 | 1620105 | 4860000 | 1621116 | 1011 | 1011 | 962 |
| 5400000 | 1799566 | 5400000 | 1800488 | 922 | 922 | 964 |
| 5940000 | 1979323 | 5940000 | 1980287 | 964 | 964 | 992 |
| 6480000 | 2159557 | 6480000 | 2160451 | 894 | 894 | 1011 (max.) |

CW = Clockwise pinion rotation
CCW = Counter clockwise pinion rotation
* - third data point is disqualified as a nick or burr increments preferably are equal increments, e.g. every 1000 encoder counts or every 30 degrees, but the method is not limited to such equal increments.

Simultaneously with recording the rotary positions of the pinion, the rotary positions of the gear are also measured by an encoder and recorded. Preferably, this measuring cycle extends for one complete revolution of the gear member. However, the process is not limited thereto. For example, a measurement cycle of only a few degrees of gear or pinion rotation may be sufficient. Conversely, a number of rotations equaling the product of the number of teeth on the gear and pinion (i.e. product of the gear ratio) may be desired whereby all possible tooth mesh combinations may occur during the measurement cycle.

When this measuring cycle is completed, the direction of master (pinion) rotation is reversed (e.g. counter clockwise), as is the direction of applied gear spindle torque, and measurements are taken in the reverse direction of rotation. The rotary measurements of the pinion are taken at exactly the same positions as in the previous measurement cycle. That is, pinion rotary measurements for clockwise and counter clockwise rotations are at the same positions. Rotary positions of the gear member are also recorded simultaneously with each pinion rotary measurement. The amount of gear and pinion rotation for this measuring cycle is identical to the amount of rotation in the previous measuring cycle.

When all the measurement information has been collected, the difference between the rotary positions measured at each measuring increment for clockwise and counter clockwise rotation are calculated. Since the master member is measured at the same rotary position in each direction of rotation, the difference between the measurements at each As can be seen from the Table, the pinion member is the master for this backlash determining process and, therefore, measurements were taken at the same rotary positions for both clockwise and counter clockwise directions. Since the positions are the same, no differences exist and these measurements effectively cancel one another.

The rotary position of the gear measured simultaneously with each pinion measurement reflects a difference in rotary position for each like clockwise and counter clockwise pinion position. For example, at the clockwise rotary pinion position of 540000, the gear position was measured at 179500 encoder counts while at the counter clockwise rotary pinion position of 540000, the gear rotary position was measured at 180450 counts for a difference of 950 counts for the gear member which represents backlash at that location on the gear.

For the third data point, the significantly differing backlash data of 308 would be indicative of a probable abnormality on a tooth surface, such as a nick or burr. The logic in the computer could reject the gearset or stop the process for a visual inspection of the gearset by the operator. The data for that point probably would not be considered valid and, therefore, most likely would be deleted from the remainder of calculated values. The computer may be programmed for minimum and maximum acceptable measured values.

The relationship between backlash and the number of encoder counts may be represented by known gear theory relationships, the following equation being preferred. In this instance the pinion is the master and the gear is the slave:

$$\text{Backlash} = \frac{D * \tan\left(\frac{N_P}{N_T} * 360\right)}{2} * \cos A * \cos B$$

wherein:

D= Gear Pitch Diameter (same units as backlash)
$N_p$= Number of Measured Encoder Counts
$N_T$= Number of Encoder Counts Per Revolution
A= Gear Spiral Angle
B= Gear Pressure Angle In situations where the gear member is the master and the pinion is the slave, the right side of the equation should be further multiplied by the gearset ratio.

For example, if the desired backlash is 0.010 inch (0.2540 mm) and the total number of encoder counts per revolution, $N_T$, is 720,000 * 3 (encoder-to-spindle ratio) =2,160,000, and the specifications for the gear member in the above Table are:

D=8,800 inches (223.52 mm)
A=27 degrees, 12 minutes
B=20 degrees solving the equation for $N_p$ (number of measured encoder counts) yields 935. Therefore, a calculated difference of 935 encoder counts for a gear member rotary position is equivalent to a backlash amount of 0.010 inch (0.2540 mm). If the acceptable range of backlash for the gear member discussed above is, for example, 0.008–0.012 inch (0.2032–0.3048 mm), then the acceptable difference in measured gear member encoder counts would be 748–1122 counts for this range of acceptable backlash. Of course it can be seen that the above equation may also be solved to determine the amount of backlash when the number of measured encoder counts are known.

The third backlash data point of 308 encoder counts is considerably out of the range of 748–1122 encoder counts of this example and this data point would be disqualified. In this case, the gearset would likely be inspected and possibly rejected. However, the remaining measured values yield a median backlash value of 937 which varies little from the preferred value of 935. Instead of the median value, an average value may also be used which, in this case, would be 944 encoder counts which also varies little from the desired value of 935.

The method of the present invention can be utilized in developing summary data for a particular gearset. By performing the inventive process at E and P axes positions at the center, toe, and heel locations, the acceptable backlash, and hence G-axis positions, can be determined at each location by utilizing known gear theory relationships in an iterative process of measuring the backlash, recording the G-axis position, and, if the backlash is unacceptable, repeatedly adjusting the G-axis position and measuring backlash until acceptable backlash is achieved and the final G-axis position is determined.

In situations where time is crucial, such as in a high production lapping environment, and a change in the G-axis position is necessary based on results of a single backlash measurement according to the present inventive method, a ΔG change could be calculated based on known gear theory relationships. The members of the gearset would then be relatively moved along the G-axis by the calculated ΔG amount, and the gearset could then be lapped.

The present invention represents a faster and more accurate method of determining backlash in gearsets. Cycle times of about 3 to about 6 seconds can be realized by the present invention while enabling a large population of data points to be read in order to produce a more accurate profile of the gearset. Aside from determining backlash for lapping or testing, backlash may also be more accurately measured to enhance final assembly of the gearset or to streamline parts for service applications.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of determining backlash in a gear set comprising first and second gear members, said first member having a number of teeth equal to or greater than said second member, said method comprising:

placing said first and second members in mesh, rotating said members whereby said first member is rotated in a first direction, recording the rotary position of one of said first and second members at predetermined increments, recording the rotary position of the other of said first and second members simultaneously with said recording of said one member, rotating said members whereby said first member is rotated in the opposite direction, recording the rotary positions of said one of said first and second members at each of said predetermined increments, said rotary positions for said one direction of rotation being the same as said rotary positions for said opposite direction of rotation, recording the rotary position of the other of said first and second members simultaneously with said recording of said one member, calculating the difference between the rotation positions recorded for said other of said first and second members at each like increment of said one member rotation in said first direction and said opposite direction, determining one of the median value or average value from said calculated rotation position differences, comparing said one of said median value or average value with a predetermined acceptable backlash value, and, (a) if said one of said median value or average value is within a desired range from said predetermined acceptable backlash value, further processing said gear and pinion members, or, (b) if said one of said median value or average value is outside of said desired range, determining the relative positional changes of said gear and pinion members necessary to achieve said acceptable backlash, relatively positioning said gear and pinion members to said determined relative positions, and, further processing said gear and pinion members.

2. The method of claim 1 wherein said determining of backlash is achieved in about 3 to about 6 seconds.

3. The method of claim 1 wherein all calculated differences are compared to a predetermined acceptable range of backlash values with any of said calculated values not within said acceptable range being disqualified.

4. The method of claim 3 wherein a minimum value, maximum value and one of a median or average value are determined from said calculated differences within said acceptable range.

5. The method of claim 4 wherein said one of said median or average value is said median value.

6. The method of claim 1 wherein said further processing comprises at least one of lapping and testing said gear and pinion members.

7. A method of determining backlash and lapping a gear set comprising a gear member and a pinion member, said gear member having a number of teeth equal to or greater than said pinion member, said method comprising:

mounting said gear member to a rotatable gear spindle, mounting said pinion member to a rotatable pinion spindle, positioning said gear and pinion members in mesh, rotating said members whereby one of said gear and pinion members is rotated in a first direction while simultaneously applying torque to the spindle of the other of said gear and pinion members in a direction opposite said first direction and in an amount to maintain contact between said gear and pinion members, the rotation of said one member being divided into a number of predetermined increments, recording the rotary position of said one of said gear and pinion members at each of said increments, recording the rotary position of the other of said gear and pinion members simultaneously with said recording of said one member, rotating said one of said gear and pinion members in the opposite direction in an amount equal to the amount rotated in said first direction, the amount of opposite direction rotation being divided into said number of predetermined increments, the starting point for said rotation in said opposite direction being the ending point for said rotation in said first direction, recording the rotary positions of said one of said gear and pinion members at each of said increments, said rotary positions for said one direction of rotation being the same as said rotary positions for said opposite direction of rotation, recording the rotary position of the other of said gear and pinion members simultaneously with said recording of said one member, calculating the difference between the rotation positions recorded for said other of said gear and pinion members at each like increment of said one member rotation in said one direction and said other direction, determining one of the median value or average value from said calculated rotation position differences, comparing said one of said median value or average value with a predetermined acceptable backlash value, and, (a) if said one of said median value or average value is within a desired range from said predetermined acceptable backlash value, lapping said gear and pinion members, or, (b) if said one of said median value or average value is outside of said desired range, determining the relative positional changes of said gear and pinion members necessary to achieve said acceptable backlash, relatively positioning said gear and pinion members to said determined relative positions, and, lapping said gear and pinion members.

8. The method of claim 7 wherein said one member is said pinion member and said other member is said gear member.

9. The method of claim 7 wherein said one of said median value or average value is said median value.

10. The method of claim 7 wherein prior to determining said median value or said average value, said method further includes:

comparing each of said calculated rotation position differences to a predetermined acceptable difference range and disqualifying any of said position differences not in said range.

11. The method of claim 7 wherein said gear and pinion members are movable with respect to one another along three mutually perpendicular axes E, P, and G and wherein said relatively positioning is effected by relative movement of said gear and pinion members along said G axis to achieve said acceptable backlash.

12. A method of determining backlash of a gear set comprising a gear member and a pinion member, said gear member having a number of teeth equal to or greater than said pinion member, said method comprising:

(a) mounting said gear member to a rotatable gear spindle, (b) mounting said pinion member to a rotatable pinion spindle, said pinion and gear members being movable with respect to one another, (c) positioning said gear and pinion members in mesh at predetermined relative positions, (d) rotating said members whereby one of said gear and pinion members is rotated in a first direction while simultaneously applying torque to the spindle of the other of said gear and pinion members in a direction opposite said first direction and in an amount to maintain contact between said gear and pinion members, the rotation of said one member being divided into a number of predetermined increments, (e) recording the rotary position of said one of said gear and pinion members at each of said increments, (f) recording the rotary position of the other of said gear and pinion members simultaneously with said recording of said one member, (g) rotating said one of said gear and pinion members in the opposite direction in an amount equal to the amount rotated in said first direction, the amount of opposite direction rotation being divided into said number of predetermined increments, the starting point for said rotation in said opposite direction being the ending point for said rotation in said first direction, (h) recording the rotary positions of said one of said gear and pinion members at each of said increments, said rotary positions for said one direction of rotation being the same as said rotary positions for said opposite direction of rotation, (i) recording the rotary position of the other of said gear and pinion members simultaneously with said recording of said one member, (j) calculating the difference between the rotation positions recorded for said other of said gear and pinion members at each like increment of said one member rotation in said one direction and said other direction, (k) determining one of the median value or average value from said calculated rotation position differences, (l) comparing said one of said median value or average value with a predetermined acceptable backlash value, and, (m) if said one of said median value or average value is within a desired range from said predetermined acceptable backlash value,
ceasing said determining of backlash,
or, (n) if said one of said median value or average value is outside of said desired range,
changing the relative position of said gear and pinion members to effect a change in backlash, and,
repeating said steps (d) through (m) or (n).

13. The method of claim 12 wherein said one member is said pinion member and said other member is said gear member.

14. The method of claim 12 wherein said one of said median value or average value is said median value.

15. The method of claim 12 wherein prior to determining said median value or said average value, said method further includes:
comparing each of said calculated rotation position differences to a predetermined acceptable difference range and disqualifying any of said position differences not in said range.

16. The method of claim 12 wherein said gear and pinion members are movable with respect to one another along three mutually perpendicular axes E, P, and G.

17. The method of claim 16 wherein said change in backlash is effected by relative movement of said gear and pinion members along said G axis.

* * * * *